UNITED STATES PATENT OFFICE.

FRANCOIS XAVIER OVIDE TRUDEL, OF MONTREAL, QUEBEC, CANADA.

FOOD PRODUCT AND PROCESS OF OBTAINING THE SAME.

1,039,849.

Specification of Letters Patent.

Patented Oct. 1, 1912.

No Drawing. Application filed June 6, 1912. Serial No. 701,968.

*To all whom it may concern:*

Be it known that I, FRANCOIS XAVIER OVIDE TRUDEL, a subject of the King of Great Britain, residing at Montreal, Quebec, Canada, have invented certain new and useful Improvements in Food Products and Processes of Obtaining the Same; and I do hereby declare that the following is a full, clear, and exact description of the invention, such as will enable others skilled in the art to which it appertains to make and use the same.

The object of my invention is to produce a milk food for infants, which is approximately of the same composition and of the same physical structure as human milk; which possesses the same nutritive properties, and is rendered digestible and easily assimilated by the most delicate infants.

Another object of my invention is to produce a substitute for mothers' milk which owing to its low cost of production can be made accessible to the infants of the poor as well as to the most favored children of the richer class.

Heretofore many attempts have been made to produce a substitute for mothers' milk, but the results have always fallen short of satisfactory products. And had they been of the proper composition as substituted for mothers' milk, the physical structure was not the same, that is the diameter of the fat globules and the size of the particles of the casein were much larger in the various products obtained; and the products which it was at different times attempted to produce, were marketed at such exclusive prices, as to put them beyond the purchasing power of the masses making them prohibited articles to the very class which must be supplied by this product of first necessity, the children of the poor, among whom is found the highest percentage of infantile mortality owing to the very want of the proper nutritive food as it was sought to produce.

In my invention I have obtained this long felt desideratum, I have produced a milk which in all its constituents, combines the properties and physical structure of human milk. This product is obtained by the following process: The milk as it is received is tested with absolute care. It must be absolutely good, pure milk of one milking, must be of a low standard of acidity, the acidity test, which is ascertained by means of an accurate acidimeter, must not show more than 18'. Any milk meeting that requirement as well as that of cleanliness is used in my product. The milk is then freed from any foreign matter which it may contain such as impurities as come from the hands of the milker and from the udder of the cow. These impurities are removed by a process of filtration which is carried out by centrifugal force.

To each hundred pounds of milk, as it comes from the filtering process, I add fifty pounds of pure water, about two pounds of butter fat according to the milks' test, and two pounds of sugar, either milk sugar or cane sugar.

Instead of adding the fifty pounds of water I may take out a portion of the casein of the milk and reduce the proportion of butter fat and sugar to be added to the mass, thereby retaining the proportion of the various nutritive elements approximately the same as is found in human milk of average quality.

In order to neutralize the germs which may be contained in the product coming from the preceding steps of my process the milk is pasteurized at a temperature of 140° to 190° Fahrenheit as may be the case, and is submitted to the process of homogenization, which insures it against separation of the elements and which, by the breaking of the fat globules, and of the particles of the casein, brings its physical structure as near as can possibly be done, to the structure of human milk. It is then cooled thoroughly. The milk is afterward sterilized under pressure at a temperature of 226° to 230° Fahrenheit and it is bottled and sealed air tight.

The product obtained resembles as near as it is possible, in its constituents, physical structure and wholesome properties, to the human milk; its composition, physical structure and percentage of the various elements and its digestibility being the same.

I have thus produced a milk for infants such as it has long been sought to obtain to replace mothers' milk, put up so that it can be shipped to the most distant points and at a price that will make it accessible to all.

Having thus fully described my invention, what I claim as new and desire to secure by Letters Patent is:

1. A process for preparing a food product which consists in taking absolutely good, pure milk showing not more than eighteen degrees of acidity, filtering said milk, adding fifty pounds of water, about two pounds of butter fat according to the milks' test and two pounds of sugar to every one hundred pounds of milk treated, pasteurizing at a temperature of one hundred and forty to one hundred and ninety degrees Fahrenheit, homogenizing and cooling, and sterilizing under pressure at a temperature of two hundred and twenty-six (226°) to two hundred and thirty (230°) degrees Fahrenheit.

2. A process for preparing a food product which consists in taking milk showing not more than eighteen degrees of acidity, filtering said milk, adding about two pounds of butter fat according to the milks' test and two pounds of sugar to every one hundred pounds of milk treated, pasteurizing at a temperature of one hundred and forty to one hundred and ninety degrees Fahrenheit, homogenizing and cooling and sterilizing under pressure at a temperature of two hundred and twenty-six to two hundred and thirty degrees Fahrenheit.

3. A process of preparing a food product which consists in taking milk showing not over eighteen degrees of acidity, filtering said milk, adding butter fat and sugar thereto in sufficient proportion to the quantity under treatment to give it approximately the constituents of human milk; pasteurizing at a temperature of one hundred and forty to one hundred and ninety degrees Fahrenheit; homogenizing and cooling, bottling and sealing air tight, and sterilizing under pressure at a temperature of two hundred and twenty-six to two hundred and thirty degrees Fahrenheit.

4. A food product consisting of pure milk of low acidity which has been thoroughly filtered, to which butter fat and sugar have been added to make it approximately identical to human milk in its composition, structure and digestibility; said milk and the added elements having been pasteurized at a temperature of one hundred and forty to one hundred and ninety degrees Fahrenheit and then homogenized, cooled and further sterilized under pressure at a temperature of two hundred and twenty-six to two hundred and thirty degrees Fahrenheit.

5. A food product consisting of pure milk of not over eighteen degrees of acidity, which has been thoroughly filtered and to which for every hundred pounds of milk there has been added fifty pounds of water, about two pounds of butter fat according to the milks' test and two pounds sugar, said milk with the new elements added thereto having been pasteurized at a temperature of one hundred and forty to one hundred and ninety degrees Fahrenheit and then homogenized and cooled and further sterilized under pressure at a temperature of two hundred and twenty-six degrees to two hundred and thirty degrees Fahrenheit.

In witness whereof I have hereunto set my hand in the presence of two witnesses.

FRANCOIS XAVIER OVIDE TRUDEL.

Witnesses:
L. A. GAUVIN,
E. J. GAUVIN.